(12) United States Patent
Kobayashi

(10) Patent No.: US 9,268,171 B2
(45) Date of Patent: *Feb. 23, 2016

(54) PROJECTION DEVICE

(71) Applicant: JVC KENWOOD CORPORATION, Yokohama-shi, Kanagawa (JP)

(72) Inventor: Manabu Kobayashi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 154 days.

This patent is subject to a terminal disclaimer.

(21) Appl. No.: 14/164,297

(22) Filed: Jan. 27, 2014

(65) Prior Publication Data

US 2014/0139754 A1    May 22, 2014

Related U.S. Application Data

(63) Continuation of application No. PCT/JP2012/064967, filed on Jun. 12, 2012.

(30) Foreign Application Priority Data

Jul. 29, 2011   (JP) ................ 2011-166171

(51) Int. Cl.
*G02F 1/1335* (2006.01)
*G03B 13/08* (2006.01)
*G03B 19/12* (2006.01)
*G02B 27/01* (2006.01)
*H04N 9/31* (2006.01)
*H04N 5/225* (2006.01)
*H04N 5/232* (2006.01)

(52) U.S. Cl.
CPC .......... *G02F 1/133553* (2013.01); *G02B 27/01* (2013.01); *G03B 13/08* (2013.01); *G03B 19/12* (2013.01); *H04N 9/3152* (2013.01); *H04N 9/3167* (2013.01); *G02F 2001/133548* (2013.01); *H04N 5/2251* (2013.01); *H04N 5/23293* (2013.01)

(58) Field of Classification Search
CPC ............ H04N 9/3167; H04N 5/23293; H04N 5/7441; G03B 13/08; G03B 19/12; G02B 27/01; G02F 1/133553
See application file for complete search history.

(56) References Cited

FOREIGN PATENT DOCUMENTS

JP        3539904 B2    7/2004
JP    2008-165066 A    7/2008

*Primary Examiner* — Richard Kim
*Assistant Examiner* — Kendrick Hsu
(74) *Attorney, Agent, or Firm* — Nath, Goldberg & Meyer; Jerald L. Meyer; Rury L. Grisham

(57) ABSTRACT

A light guide plate receives light, which is emitted from a light source, and emits the light from a light emitting surface. A prism sheet reflects light at a predetermined angle among the light emitted from the light emitting surface, allows the reflected light to enter the light guide plate, and transmits light at another angle thereamong. Between a ¼ wavelength plate and a reflection-type liquid crystal display element, a polarization control element is provided in parallel to the light emitting surface. The polarization control element splits the light, which is emitted from the ¼ wavelength plate, into first polarized light allowed to transmit as illumination light that enters the reflection-type liquid crystal display element and second polarized light reflected so as to enter the light guide plate 3, and reflects the light modulated and emitted by the reflection-type liquid crystal display element.

3 Claims, 1 Drawing Sheet

PROJECTION DEVICE

CROSS REFERENCE TO RELATED APPLICATION

This application is a Continuation of PCT Application No. PCT/JP2012/064967, filed on Jun. 12, 2012, and claims the priority of Japanese Patent Application No. 2011-166171, filed on Jul. 29, 2011, the entire contents of all of which are incorporated herein by reference.

BACKGROUND

The present disclosure relates to a projection device using a reflection-type liquid crystal display element.

In recent years, a digital single-lens reflex camera, on which an electronic viewfinder using a liquid crystal display device is mounted, has been on sale. In the Micro Four Thirds System standard employed in the digital single-lens reflex camera, a conventional optical viewfinder cannot be used, and an electronic viewfinder is used. In Japanese Patent No. 3539904 (Patent Literature 1), a reflection-type liquid crystal display device to be used as the electronic viewfinder is described.

SUMMARY

As one of the performances required for the electronic viewfinder, it is mentioned that the electronic viewfinder should have an MTF (Modulation Transfer Function) equal to or more than that of the optical viewfinder. In the electronic viewfinder, it is necessary to form an image, which is reflected on a reflection-type liquid crystal display element, onto a retina of an eye.

In the reflection-type liquid crystal display device (projection device) described in Patent Literature 1, a semitransparent reflective sheet, which is arranged at an inclination of 45 degrees with respect to the reflection-type liquid crystal display element, is used. The semitransparent reflective sheet arranged at the inclination of 45 degrees causes astigmatism, and owing to this, such an MTF of an imaging system is lowered.

Moreover, when the semitransparent reflective sheet is used, only half of the polarized light can be used, and the image is darkened. When the image is attempted to be brightened, it is necessary to increase a quantity of light to be emitted from a light source, and accordingly, power consumption is increased.

It is an object of the embodiments to provide a projection device capable of displaying a bright image by suppressing the lowering of the MTF.

An aspect of the embodiments provides a projection device comprising: a light source; a light guide plate configured to receive light emitted from the light source, and emit the light from a light emitting surface; a prism sheet configured to reflect light at a predetermined angle among the light emitted from the light emitting surface, allow the reflected light to enter the light guide plate one more time, and transmit light at another angle; a ¼ wavelength plate configured to receive the light that has transmitted through the prism sheet; a reflection-type liquid crystal display element that is provided at an inclination with respect to the light emitting surface, and configured to modulate and emit received illumination light; and a polarization control element that is provided between the ¼ wavelength plate and the reflection-type liquid crystal display element so as to be parallel to the light emitting surface, configured to split the light emitted from the ¼ wavelength plate into first polarized light and second polarized light, and reflect the light modulated and emitted by the reflection-type liquid crystal display element, wherein the first polarized light is light allowed to enter, as the illumination light, the reflection-type liquid crystal display element, the light being emitted from the ¼ wavelength plate, and the second polarized light is light reflected so as to be allowed to enter the ¼ wavelength plate, the light being emitted from the ¼ wavelength plate.

DETAILED DESCRIPTION

A description is made below of projection devices of the respective embodiments with reference to the accompanying drawings.

First Embodiment

Figure 1:
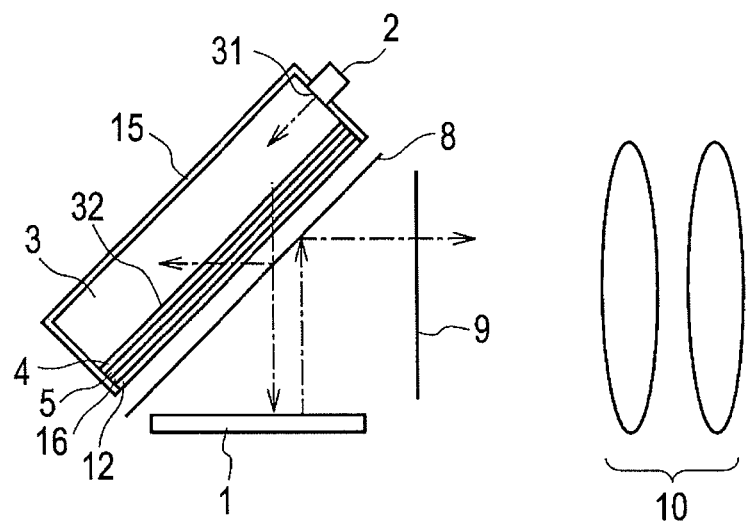
FIG. 1 is a configuration diagram showing a projection device according to a first embodiment.

In FIG. 1, on an end surface 31 of a light guide plate 3, a light source 2 such as an LED is provided. Light emitted from the light source 2 enters an inside of the light guide plate 3 from the end surface 31. On one of surfaces of the light guide plate 3, a reflective sheet (reflector) 15 is provided. A protrusion may be provided on the light guide plate 3 and may be used as the reflector, or a reflective surface may be formed by printing.

The light, which has traveled into the inside of the light guide plate 3 and has entered the reflective sheet 15, is reflected on the reflective sheet 15, and goes toward a light emitting surface 32 as another surface of the light guide plate 3.

While being brought into contact with or brought close to the light emitting surface 32, a diffusion plate 4, a prism sheet 5, a diffusion plate 16, a ¼ wavelength plate 12 are provided from a side close to the light emitting surface 32. The light, which has entered the diffusion plate 4, is diffused, and enters the prism sheet 5. The prism sheet 5 is provided with angular selectivity, reflects light, which has entered the same at a certain angle, and transmits light, which has entered the same at angles other than the certain angle.

The light, which is reflected on the prism sheet 5, passes through the diffusion plate 4 and enters the light guide plate 3 one more time, and is reflected on the reflective sheet 15. The light, which is reflected on the reflective sheet 15, is diffused by the diffusion plate 4, enters the prism sheet 5, and repeats similar operations.

In such a way, the light guide plate 3 functions to roughly reduce luminance unevenness of the light, and to form a beam of illumination light. The prism sheet 5 functions to increase the illumination light.

The light, which has transmitted through the prism sheet 5, enters the diffusion plate 16 and is diffused there, then transmits through the ¼ wavelength plate 12, and enters a polarization control element 8. Since the light is diffused by the diffusion plate 16, the illuminance unevenness can be further reduced.

Note that, by appropriately configuring the light guide plate 3, the diffusion plates 4 and 16 and the prism sheet 5, the light emitted from the ¼ wavelength plate 12 can be turned to light having directivity, which allows the light to go toward a direction inclined with respect to a direction perpendicular to the light emitting surface 32.

The polarization control element 8 is arranged in a state of being spaced apart from the ¼ wavelength plate 12 at a predetermined distance. The polarization control element 8 is arranged in parallel to the light emitting surface 32, diffusion plate 4, prism sheet 5, diffusion plate 16 and ¼ wavelength plate 12 of the light guide plate 3, and confronts the ¼ wavelength plate 12 in a state of being brought close thereto.

An example of the polarization control element 8 is a wire grid-type polarization beam splitter. By using such a configuration, in which the light guide plate 3, the diffusion plate 4, the prism sheet 5 and the diffusion plate 16 are combined with one another, the luminance unevenness of the light can be reduced, and quality of the image to be projected and displayed can be enhanced.

Note that the wire grid-type polarization beam splitter is a polarization control element, in which a metal material is evaporated on a glass substrate, and a wire-like grid is formed by micro etching at a nanometer level.

A reflection-type liquid crystal display element 1 is arranged in a state of being spaced apart from the polarization control element 8 at a predetermined distance. The reflection-type liquid crystal display element 1 is arranged so as to be inclined at 45 degrees with respect to the light emitting surface 32, diffusion plate 4, prism sheet 5, diffusion plate 16, ¼ wavelength plate 12 and the polarization control element 8 of the light guide plate 3. Light that enters the polarization control element 8 is indefinitely polarized light, in which polarized components are split by the polarization control element 8.

Linearly polarized light (first polarized light), which has transmitted through the polarization control element 8, enters, as the illumination light, the reflection-type liquid crystal display element 1. Meanwhile, with regard to linearly polarized light (second polarized light), which is reflected on the polarization control element 8, a polarization direction thereof is perpendicular to that of the polarized light that has transmitted through the polarization control element 8. The linearly polarized light, which is reflected on the polarization control element 8, enters the ¼ wavelength plate 12 one more time. The ¼ wavelength plate 12 converts the linearly polarized light, which has entered the same, into circularly polarized light.

The circularly polarized light, which is emitted from the ¼ wavelength plate 12, transmits through the diffusion plate 16, the prism sheet 5 and the diffusion plate 4, enters the inside of the light guide plate 3, and is reflected on the reflective sheet 15. The circularly polarized light thus reflected transmits through the inside of the light guide plate 3 and the diffusion plate 4 one more time, and enters the prism sheet 5. In a similar way to the above mentioned, the prism sheet 5 reflects light, which has entered the same at a certain angle, and transmits light, which has entered the same at angles other than the certain angle.

The circularly polarized light, which has transmitted through the prism sheet 5, transmits through the diffusion plate 16, enters the ¼ wavelength plate 12, and returns to the linearly polarized light. Since this linearly polarized light has transmitted through the ¼ wavelength plate 12 twice, a polarization direction thereof rotates by 90 degrees with respect to the polarization direction of the linearly polarized light, which is reflected on the polarization control element 8.

Therefore, without being reflected on the polarization control element 8, the linearly polarized light, which is emitted from the ¼ wavelength plate 12, transmits through the polarization control element 8, and enters, as the illumination light, the reflection-type liquid crystal display element 1.

The light, which has entered the reflection-type liquid crystal display element 1, is modulated in response to the image, which is to be projected by the reflection-type liquid crystal display element 1, followed by emission. The light, which is emitted from the reflection-type liquid crystal display element 1, is reflected on the polarization control element 8, transmits through a polarizing plate 9 and enters an eyepiece (imaging lens) 10. The light, which is emitted from the eyepiece 10, enters the eyes of a person who looks into an electronic viewfinder.

The respective optical elements of the first embodiment, which are described above, are positioned by a circuit board and a positioning member, which are not shown.

In the projection device of the first embodiment, the light, which is reflected on the reflection-type liquid crystal display element 1, does not transmit through such a semitransparent reflective sheet, which is arranged at an inclination of 45 degrees, as provided in the conventional configuration, but is reflected on the polarization control element 8, and accordingly, an MTF thereof is not lowered.

The light, which is reflected on the polarization control element 8, transmits through the polarizing plate 9; however, since the polarizing plate 9 is arranged at an angle of 90 degrees with respect to an optical axis, an influence thereof on the MTF is hardly present, or very little even if being present.

Moreover, in the projection device of the first embodiment, the polarization control element 8 and the ¼ wavelength plate 12 are used, each of which transmits light in a certain polarization direction and reflects light in a direction having an angle of 90 degrees with respect to the polarization direction, and accordingly, the light can be utilized without waste, and a quantity of the illumination light can be increased. Hence, power consumption of the light source 2 can be reduced.

In a case where the projection device of the first embodiment is used for the electronic viewfinder of a camera, it becomes possible to use the camera for a longer time. If an operating time is the same as heretofore, then a battery can be downsized, and it also becomes possible to reduce weight of the camera.

Furthermore, in the projection device of the first embodiment, the polarization control element 8 is arranged in parallel to the light emitting surface 32, diffusion plate 4. prism sheet 5, diffusion plate 16 and ¼ wavelength plate 12 of the light guide plate 3, and is opposed to the ¼ wavelength plate 12 while being brought close thereto, and accordingly, the light, which is reflected on the polarization control element 8, is directly taken into the light guide plate 3 through the ¼ wavelength plate 12, the diffusion plate 16, the prism sheet 5 and the diffusion plate 4.

Hence, it is not necessary to provide a reflecting mirror for taking the light, which is reflected on the polarization control element 8, into the light guide plate 3. Since it is not necessary to provide the reflecting mirror for taking the light, which is reflected on the polarization control element 8, into the light guide plate 3, it is possible to downsize the projection device of the first embodiment.

Second Embodiment

Figure 2:
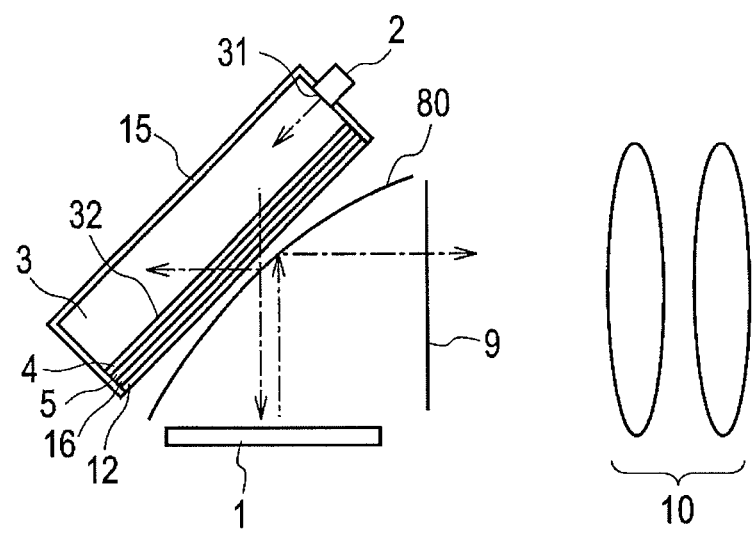
FIG. 2 is a configuration diagram showing a projection device according to a second embodiment.

In a second embodiment shown in FIG. 2, the same reference numerals are assigned to the same portions as those in the first embodiment shown in FIG. 1, and a description thereof is omitted. In the second embodiment shown in FIG. 2, in place of the polarization control element 8, a polarization control element 80, which is formed of a curved surface convex on the ¼ wavelength plate 12 side, is provided.

The polarization control element 80 plays a role of a lens, which converges the light in an event of reflecting the light modulated by the reflection-type liquid crystal display element 1 and emitted therefrom. Since the polarization control element 80 plays a role of the lens that converges the light, the image can be formed by both of the polarization control element 80 and the eyepieces 10.

In accordance with each of the projection devices of the first and second embodiments, a bright image can be displayed by suppressing the lowering of the MTF.

The present invention is not limited to the first and second embodiments described above, and is modifiable in various ways within the scope without departing from the spirit of the present invention.

In each of the first and second embodiments, the diffusion plate 4 is provided as a separate body from the light guide plate 3; it is also possible to contain the function of the diffusion plate 4 in the light guide plate 3. Moreover, the light source 2 is provided on the end surface 31 of the light guide plate 3; however, may be provided on a back surface of the light guide plate 3, and an installation position of the light source 2 and a connection configuration thereof to the light guide plate 3 are arbitrary.

In each of the first to second embodiments, the case where the projection device is used for the electronic viewfinder is taken as an example; however, the projection device may be used for other purposes such as a head mounted display.

What is claimed is:

1. A projection device comprising:
   a light source;
   a light guide plate configured to receive light emitted from the light source, and emit the light from a light emitting surface;
   a prism sheet configured to reflect light at a predetermined angle among the light emitted from the light emitting surface, allow the reflected light to enter the light guide plate one more time, and transmit light at another angle;
   a ¼ wavelength plate configured to receive the light that has transmitted through the prism sheet;
   a reflection-type liquid crystal display element that is provided at an inclination with respect to the light emitting surface, and configured to modulate and emit received illumination light; and
   a polarization control element that is provided between the ¼ wavelength plate and the reflection-type liquid crystal display element so as to be parallel to the light emitting surface, configured to split the light emitted from the ¼ wavelength plate into first polarized light and second polarized light, and reflect the light modulated and emitted by the reflection-type liquid crystal display element,
   wherein the first polarized light is light allowed to enter, as the illumination light, the reflection-type liquid crystal display element, the light being emitted from the ¼ wavelength plate, and
   the second polarized light is light reflected so as to be allowed to enter the ¼ wavelength plate, the light being emitted from the ¼ wavelength plate.

2. The projection device according to claim 1, wherein the polarization control element is provided with an inclination of 45 degrees with respect to the reflection-type liquid crystal display element.

3. The projection device according to claim 1, wherein the polarization control element is formed of a curved surface convex on the ¼ wavelength plate side.

* * * * *